United States Patent [19]
Wulf

[11] 3,894,609
[45] July 15, 1975

[54] INSTALLATION FOR INCREASING THE ROAD TRACTION IN A VEHICLE

[75] Inventor: Helmut Wulf, Nellingen, Germany

[73] Assignee: Daimler-Benz Aktiengesellschaft, Germany

[22] Filed: Oct. 19, 1973

[21] Appl. No.: 408,095

[30] Foreign Application Priority Data
Oct. 19, 1972  Germany............................ 2251152

[52] U.S. Cl. .................... 180/115; 188/5; 180/127; 244/100 A; 244/110 A
[51] Int. Cl. ............................................. B60t 1/14
[58] Field of Search ................. 180/115, 124, 7 R; 244/110 E, 110 H, 100 A; 188/5

[56] References Cited
UNITED STATES PATENTS

| | | | |
|---|---|---|---|
| 1,698,482 | 1/1929 | Nicin .................................. | 180/115 |
| 3,209,849 | 10/1965 | Gondert et al. ...................... | 180/115 |
| 3,221,831 | 12/1965 | Weiland ............................... | 180/124 |
| 3,327,799 | 6/1967 | Guienne et al. ...................... | 180/124 |
| 3,398,809 | 8/1968 | Wood et al. ......................... | 180/124 |
| 3,628,625 | 12/1971 | Boyles, Jr. ............................ | 180/115 |
| 3,659,678 | 5/1972 | Hall ...................................... | 180/115 |
| 3,726,357 | 4/1973 | Gaufillet .............................. | 180/124 |
| 3,790,110 | 2/1974 | Earl ...................................... | 180/124 |

*Primary Examiner*—David Schonberg
*Assistant Examiner*—John P. Silverstrim
*Attorney, Agent, or Firm*—Craig & Antonelli

[57] ABSTRACT

An installation for increasing the ground traction in a vehicle, especially in a passenger motor vehicle below which a vacuum is adapted to be produced by suction for the removal of air at least within a partial area that is defined by a shielding device that can be selectively shifted from its rest position remote from the ground into a use position near the ground and which is provided between the vehicle and the road surface; the shielding device is thereby constituted by an annular cushion surrounding the partial area to be subjected to vacuum whereby the annular cushion is suitably connected with the vehicle superstructure.

36 Claims, 5 Drawing Figures

FIG.1

PATENTED JUL 15 1975 3,894,609
SHEET 1
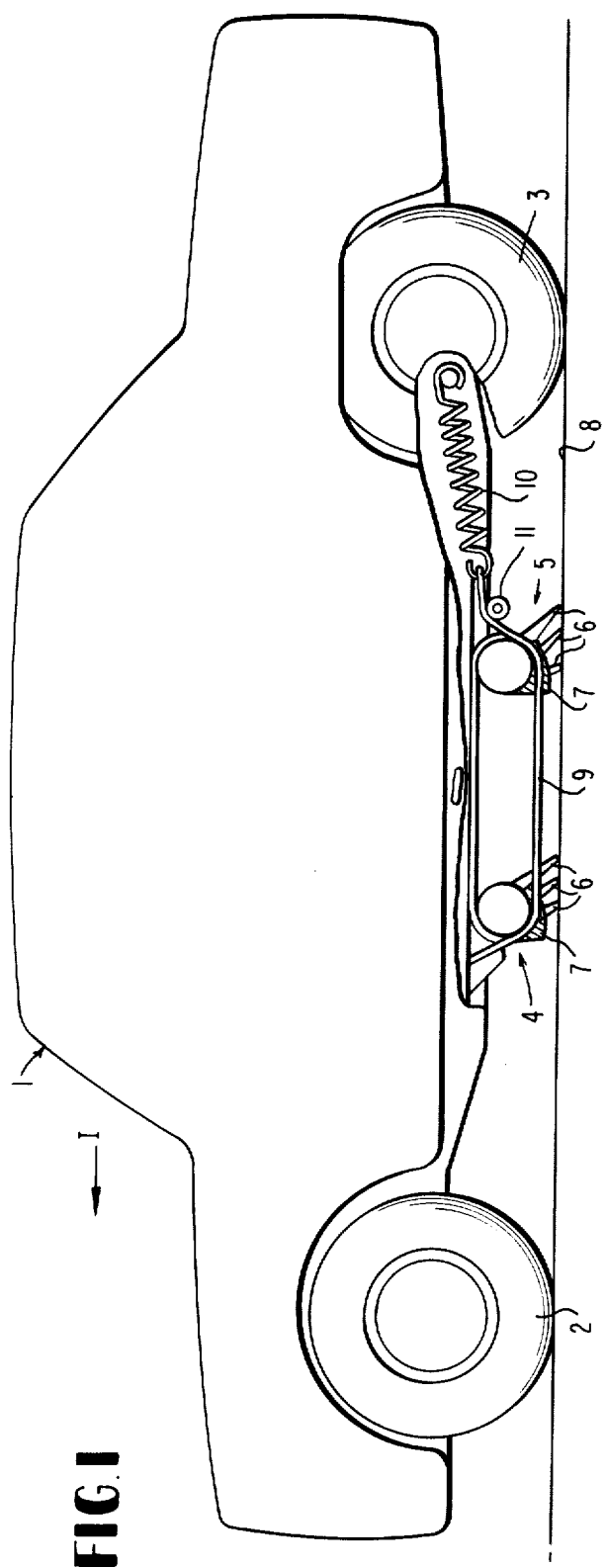
FIG. 1
FIG. 2
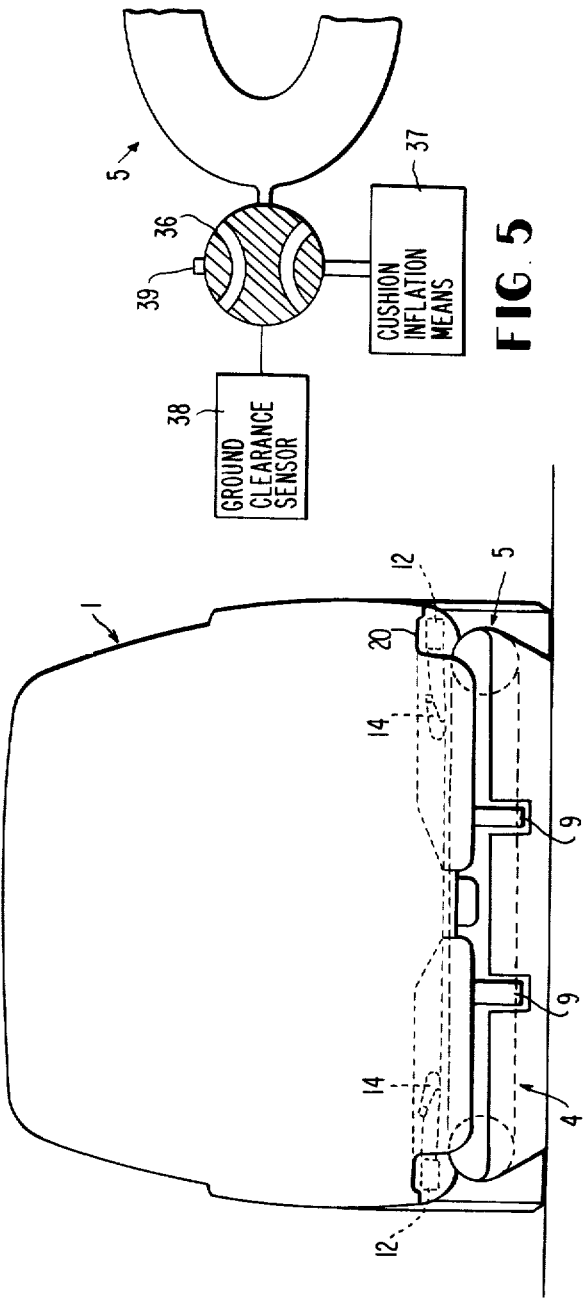
FIG. 5

INSTALLATION FOR INCREASING THE ROAD TRACTION IN A VEHICLE

The present invention relates to an installation for increasing the road traction or ground adhesion in a vehicle, especially in a passenger motor vehicle, below which a vacuum is adapted to be produced for the removal of air by suction at least within a partial area which is adapted to be delimited by a screening or shielding device provided between the vehicle and the road surface and adapted to be transferred from a rest position remote from the ground into a use position near the ground.

In a prior art installation of this type, the partial area below the vehicle, out of which air is to be sucked off for producing a vacuum, is limited by a cage open toward the road surface whose walls are formed by flaps that are to be pivoted down about horizontal axes out of the rest position thereof into the use position in which they are to adjoin sealingly the road surface. However, such a construction requires a relatively large mechanical expenditure and additionally can be readily damaged by unevennesses in the ground. Furthermore, with such a construction also an adaptation to changed distances between vehicle superstructure and road surface, as result from inward spring deflections, is difficult.

The present invention is concerned with the task to so construct an installation of the aforementioned type that it includes a relatively simple construction which is particularly low in need of servicing as well as capable of ready servicing and that it assures additionally also a closure with respect to the road surface which is as good as possible coupled with slight sensitivity to ground unevennesses.

According to the present invention, this is achieved with an installation of the aforementioned type in that the screening or shielding device is formed by an annular cushion enclosing the partial zone to be placed under vacuum, which is connected with the vehicle superstructure. The use of such a ring cushion enables both a good adaption to ground unevennesses as also to changed spacings between vehicle superstructure and road surface and it leads in particular also to a constructively simple and insensitive type of construction.

A solution which is particularly advantageous within the scope of the present invention resides in utilizing a ring cushion which is adapted to be inflated for transferring the shielding device out of its rest position into its use position since in this manner a particularly large ground clearance for the vehicle can be achieved for the rest position of the shielding device and since thus additionally also the changeover out of the rest position into the use position can be achieved in a particularly rapid and simple manner. In particular, with an inflatable annular cushion, a good adaptation to the ground clearance dependent on the degree of inward spring deflection of the vehicle can be achieved by changing the inflating pressure.

According to a further feature of the present invention, it is appropriate to use a hose-like annular cushion which in the inflated condition has a circularly shaped cross section. Particularly with a view toward the adaptability both to the ground unevennesses as well as to the degree of inward spring deflection of the vehicle, it is furthermore advantageous if the annular cushion consists of an elastically deformable material.

According to a further embodiment within the scope of the present invention, however, also a ring cushion may be provided as screening or shielding device which includes an annular channel consisting of rigid material whose side open toward the road surface is formed by a covering forming an air-tight closure of the annular channel. This covering may be appropriately so mounted at the annular channel that in the rest position of the screening or shielding device, it lies at least essentially within the annular channel and is adapted to be inverted out of the annular channel for the transfer of the shielding device into the use position. Appropriately, also in this case the shielding device may consist of an elastically deformable material. Also, with this embodiment, an adaptation to the respectively available ground clearance is possible by a pressure-dependent inflatability of the annular cushion. Especially in connection therewith, it is appropriate within the scope of the present invention if the degree of filling of the ring cushion is controllable in dependence on the respectively existing ground clearance, i.e., also in dependence on the load-conditioned ground clearance of the vehicle.

In order to establish a closure between the annular cushion in the use position of the shielding device and the road surface which is as air-tight as possible, it is appropriate to provide the ring cushion on its side facing the road surface in the inflated condition with at least one preferably lip-shaped sealing strip which assures a good adaptation to ground unevennesses. In order to prevent a tipping or turning over of the sealing strips, for example, in case of larger ground unevennesses or during a very sudden reduction of the ground clearance of the vehicle as a result of the inward spring deflection thereof, it is appropriate if the ground clearance of the side of the sealing cushion facing the road surface in the inflated condition is determined by at least one support element. At least one support rib connected with the annular cushion may be provided as such support element which, at the same time, contributes to the further and improved sealing action of the annular cushion with respect to the road surface.

In order to arrive with such a basic construction at a closure which is as air-tight as possible, it is appropriate if the support rib is disposed essentially in front of the sealing strips in relation to the driving direction within the areas of the ring cushion extending transversely to the driving direction. However, also other solutions are feasible, of course, within the scope of the construction according to the present invention, in which the support rib is located to the rear of the sealing strips or in which sealing strips are provided on both sides of the support rib. However, in particular those solutions, in which the support rib is provided essentially in front of the sealing strips in relation to the driving direction, enable in a simple manner an over-all arrangement in which the sealing strips are arranged pulled or dragged in relation to the driving direction and are disposed with their area adjoining the sealing cushion in front of the area abutting at the road surface. A pulled arrangement of the sealing strips may be realized within the scope of the solution according to the present invention in connection with annular cushions having an eliptical base shape, as viewed in plan view, practically over the entire circumference of the annular cushion, and more particularly if the annular cushion delimits an eliptical space with a major axis disposed transversely to the vehicle longitudinal axis.

For the return of the annular cushion and/or of the covering of the annular cushion out of the use position into the rest position and/or for the mounting and retention of the annular cushion and/or of the covering of the annular cushion in the rest position, it is appropriate if the annular cushion and/or the covering thereof is adapted to be stressed in the direction of its rest position by at least one retaining member.

The retaining member may be formed either itself by a spring element or may be held correspondingly springly. Within the scope of a preferred solution for the screening or shielding device formed by the annular cushion, it is appropriate if bands are provided as retaining members which engage at the ring cushion within the area of its zone facing the ground.

Accordingly, it is an object of the present invention to provide an installation for increasing the road traction in a vehicle, especially in a passenger motor vehicle, which avoids by simple means the aforementioned shortcomings and drawbacks encountered in the prior art.

Another object of the present invention resides in an installation for increasing the ground adherence of a motor vehicle which obviates the need for relatively large mechanical expenditures and is relatively free from the likelihood of damage due to ground unevennesses.

A further object of the present invention resides in an installation for increasing the road traction in a motor vehicle which can readily adapt ifself to changes in spacing between the vehicle superstructure and road surface.

Still another object of the present invention resides in an installation of the type described above which not only assures a good closure with respect to the road surface but also offers a construction that is relatively free of service requirements.

A still further object of the present invention resides in an installation for increasing the ground traction of motor vehicles which can be readily changed from its rest position into its use position.

These and other objects, features and advantages of the present invention will become more apparent from the following description when taken in connection with the accompanying drawing which shows, for purposes of illustration only, several embodiments in accordancee with the present invention, and wherein:

FIG. 1 is a schematic side view of a passenger motor vehicle with an installation for increasing the road traction arranged therebelow and constructed in accordance with the present invention with the parts thereon in the use position;

FIG. 2 is a schematic rear elevational view of the passenger motor vehicle illustrated in FIG. 1 whereby the installation for increasing the road traction according to the present invention is again shown, as in FIG. 1, in the use position thereof;

FIG. 5 is a schematic representation of a control arrangement for the filling of the installation for increasing road traction in accordance with the present invention.

Figure 3:
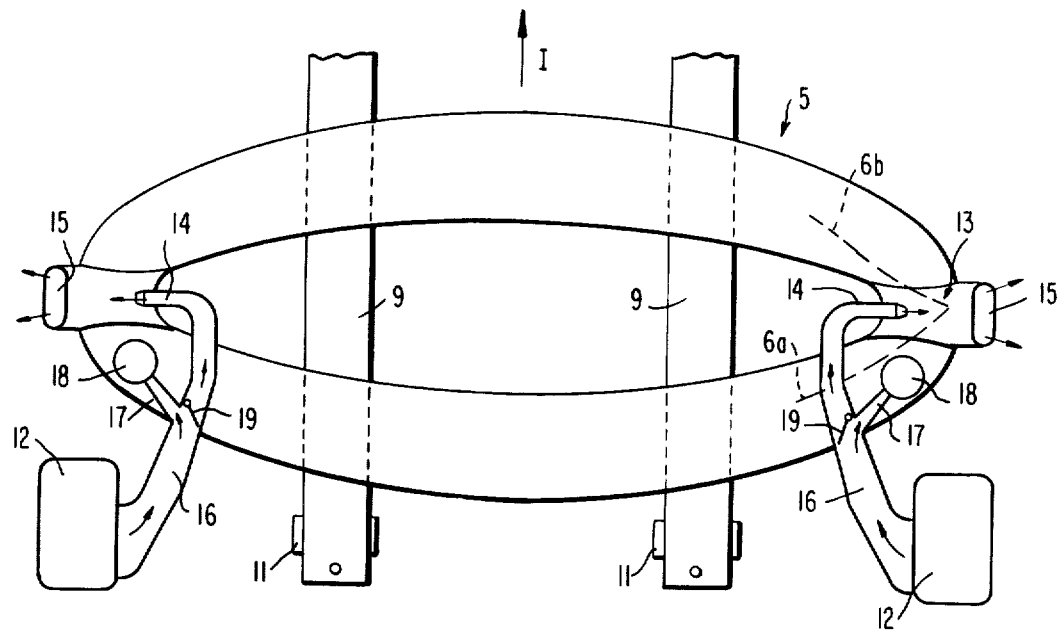
FIG. 3 is a schematic plan view on the installation for increasing the road traction according to the present invention in connection with the means for producing the vacuum.

Referring now to the drawing wherein like reference numerals are used throughout the various views to designate like parts, reference numeral 1 generally designates in the various figures a passenger motor vehicle, below which the installation according to the present invention for increasing the road traction by air suction removal, which is generally designated by reference numeral 4, is arranged within the area between the front axle 2 and the rear axle 3.

The installation 4 includes a screening or shielding device which in the illustrated embodiment is constituted by an inflatable annular cushion generally designated by reference numeral 5 consisting preferably of an elastically expansible material with lip-shaped sealing strips 6 as well as a sealing strip support element constituted by a circumferentially extending rib 7 being attached to the annular cushion 5 within the area of the annular cushion facing the ground. The support rib 7 serves the purpose to determine a minimum distance between the road surface 8 and the annular cushion 5, as has proved appropriate with the use of such lip-shaped sealing strips with a view toward an effective seal between annular cushion 5 and road surface 8. The sealing strips 6 are so arranged in relation to the driving direction of the vehicle indicated by arrow I that their connection at the cushion 5 is located in front of the abutment zone on the side of the ground, as viewed in the driving direction I. Pulled or dragged sealing strips 6 result therefrom which produce an adaptable seal with respect to the road surface.

In order to be able to realize a pulled or dragged arrangement of the lip-shaped sealing strips 6 over the entire circumference of the annular cushion 5, the annular cushion 5 has an eliptical base shape as viewed in plan view, as can be seen in FIG. 3, whereby the major axis of the elipse is disposed transversely to the driving direction. This can be achieved with this ring shape for the cushion 5 in that the lip-shaped sealing strips 6 extend each outwardly approximately tangentially to the longitudinal axis of the elipse within the area of the small radii of curvature of the elipse and are connected with each other or pass over into one another within the area of their ends. This configuration of the sealing strips is schematically shown in dash lines for two sealing strips within the area of the small radii of curvature of the elipse in FIG. 3 on the right side of this figure. The dash lines symbolizing two sealing strips disposed on different sides of the longitudinal axis of the elipse are designated by reference numerals 6a and 6b.

It is, of course, also possible within the scope of the solution according to the present invention differing from the embodiment illustrated in FIG. 1, in which three sealing strips 6 are provided and in which a particularly good seal is achieved by the labyrinth effect of the sealing strips disposed one behind the other in relation to the driving direction, to operate exclusively with one or with two sealing strips. The sealing strips 6 may thereby start, as illustrated in FIG. 1, either from the support rib 7 or also from the circumference of the ring cushion 5.

An inflatable annular cushion 5 of conventional type is used in the illustrated embodiment which is not shown in detail. For purposes of adaptation to the clear height between the vehicle and the road surface which changes depending on the given loading or load condition of the vehicle, thereby as shown in FIG. 5, a conventional control valve 36 may be provided to control the filling degree of the annular cushion 5 by a suitable inflation means 37, for example, a pump such as disclosed in U.S. Pat. No. 3,327,799, in dependence on the load or loading condition of the vehicle sensed by a conventional load sensor or feeler 38 such as disclosed in U.S. Pat. No. 2,757,376 thereby avoiding an undesired support of the vehicle by way of the ring cushion. As the ground clearance increases, due to a decrease in the load condition of the vehicle, the annular cushion 5 would be more strongly inflated; however, as the ground clearance decreases, due to an increase in the load condition of the vehicle, air is exhausted from the annular cushion 5 through a vent 39.

In the embodiment according to FIGS. 1 to 3, a device is coordinated to the annular cushion 5 serving as shielding device, by means of which the annular cushion 5 in its rest position, in which it is not inflated, is retained underneath the vehicle floor with the least possible structural height in order not to impair the road clearance of the vehicle by the installation according to the present invention in its rest position. The aforementioned device is formed in the embodiment according to FIGS. 1 to 3 by two bands 9 extending in the vehicle longitudinal direction and disposed on both sides of the vehicle longitudinal center plane, which are stressed by springs 10 in the direction of their stretched or tightened position. The bands 9 are, as illustrated in FIG. 1, mounted in their forward end area in a suitable manner at the floor of the vehicle, extend underneath the annular cushion 5 and are guided in their rear area by way of a reversing roller 11 again disposed in proximity to the floor of the vehicle so that during a decrease of the pressure within the annular cushion 5, the latter is lifted toward the vehicle floor by reason of the spring stress acting on the bands 9. The bands 9 extend in the described arrangement, as shown in FIG. 1, near the side of the annular cushion 5 facing the road surface underneath the same so that a direct ground contact of the bands 9 is prevented by the ribs 7. Slot-shaped apertures for the bands 9 may be provided inside the ribs 7 which is not illustrated in detail. However, the bands 9 may also be mounted at the outer circumference of the annular cushion 5 prior to the installation of the ribs 7. The bands 9, in addition to their task described hereinabove, also serve the purpose to absorb the forces which become effective on the annular cushion 5 opposite the driving direction. Consequently, the springs 10 serving as tightening elements for the bands 9 engage at the rear ends of the bands 9 in relation to the driving direction I.

It is, of course, also possible within the scope of the solution according to the present invention to retain the annular cushion 5 in its rest position as well as also to transfer the same into the rest position in that the air is sucked out of the annular cushion 5 and the latter is subjected to vacuum.

In addition to the details of construction described hereinabove, in particular FIGS. 2 and 3 illustrate the devices possible within the scope of the present invention for producing the vacuum in the space enclosed by the annular cushion 5 in its operating position. These devices are constituted in the illustrated embodiment by a solid material gas generator 12 of any conventional construction and by an ejector 13 which includes the feed pipe 14 supplied with pressure gas by the solid material gas generator 12 and the mixing pipe 15. The feed pipe 14 is in communication with the solid material gas generator 12 by way of a line 16. A line 17 may be branched off from the line 16, as is indicated in FIG. 3, by way of which propellant gas is fed to the filling valve 18 of the annular cushion 5 for purposes of inflating the annular cushion. A control valve or flap 19 may be additionally provided in the connection between the lines 16 and 17. Of course, it would also be possible within the scope of this solution to establish a direct line connection between the filling valve 18 and the solid material gas generator 12.

It is appropriate within the scope of the solution according to the present invention if the solid material gas generator 12, as indicated in FIG. 2, is arranged in the longitudinal bearer of the vehicle 1. Furthermore, also the mixing pipe 15 of the ejector 13 may extend appropriately through the longitudinal bearer which is designated in FIG. 2 by reference numeral 20 because, in this manner, the elements of the described device do not impair the ground clearance of the vehicle. Of course, also other pressure gas sources, such as, for example, pressure gas bottles, may be provided within the scope of the solution according to the present invention for the production of the necessary vacuum and/or for the production of the inflating pressure for the annular cushion. Furthermore, also the use of blowers and in particular cross-flow blowers is possible for the indicated purpose whereby the required expenditures and the necessary structural volume, however, become larger.

Figure 4:
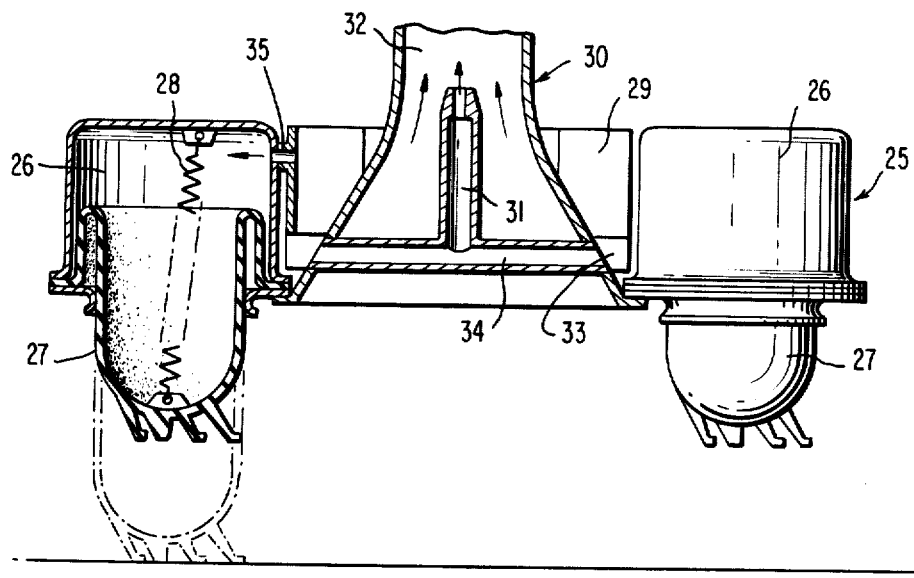
FIG. 4 is a schematic view, partly in cross section, of a further embodiment of an installation for increasing the road traction in accordance with the present invention.

Whereas in the embodiment according to FIGS. 1 to 3, a hose-like annular cushion is used, in the embodiment according to FIG. 4, which illustrates merely schematically an installation for producing the vacuum within a definable space adapted to be bounded off, an annular cushion generally designated by reference numeral 25 is used, which includes a form-rigid, channel-like upper part open in the downward direction, i.e., an annular channel 26 whose open side facing the road surface is provided with a covering 27. The covering 27 consists at least of deformable, preferably, however, of elastically deformable material and is connected with the ring channel 26 in a conventional manner within the area of the edge zones thereof. The covering 27 in the embodiment according to FIG. 4 is so laid out as blank that its width is considerably larger than the width of the ring channels 26 so that it can be inflated independently of any elasticity of the material forming the same by the supply of pressure gases into the ring channel 26 and therewith can be extended in the direction toward the road surface. Large differences in the ground clearance of the vehicle can thereby be compensated for in dependence on the size of the covering 27 in its entended width in relation to the width of the channel 26. This becomes clear by reference to the left cross-sectional illustration in FIG. 4, in which the seal is illustrated in dash lines in the case of a large ground clearance, i.e., with an outwardly spring deflected vehicle while the seal is illustrated in full lines in case of a slight ground clearance, i.e., with an inwardly spring deflected vehicle. In the rest position (not shown) the covering 27 is almost completely turned over into the ring channel 26 which is already in part the case for the position of the covering 27 illustrated in full line, whereby the covering 27 may be held within the annular channel 26, for example, by a vacuum prevailing therein. On the other hand, also retaining members may be provided for this purpose within the scope of the present invention as is indicated in the left crosssectional view according to FIG. 4. A spring 28 thereby serves as retaining member which engages, on the one hand, at a wall of the channel 26 and, on the other, at the covering 27.

In addition to the described construction of the shielding device, FIG. 4 also illustrates a possible installation for the production of the vacuum within the area delimited by the shielding device, whereby also this installation is only illustrated schamatically. It includes in the arrangement illustrated in FIG. 4, a ring-shaped solid material gas generator 29 of any conventional construction, to which is coordinated an ejector 30 having a feed pipe 31 and a mixing pipe 32 for sucking off the air. The unit consisting of the solid material gas generator 29 and of the ejector 30 is thereby surrounded by the annular channel 26 of the annular cushion 25. The connection from the solid material generator 29 to the feed pipe 31 is established by an annular line 33 and radially from the latter, by connecting lines 34 extending radially from the line 33 to the central supply line 31. Additionally, a connection from the solid material gas generator 29 to the ring channel 26 is illustrated at 35 so that the solid material gas generator may also supply the required pressure gas for the inflation of the ring cushion 25 possibly by way of corresponding control devices. With respect to the shape of the annular cushion in plan view and the arrangement of the sealing strips, the arrangement according to FIG. 4 is constructed, for example, corresponding to that according to FIGS. 1 to 3 and reference is made to the embodiment of FIGS. 1 to 3 for the details thereof.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. An installation for increasing the road traction between a vehicle and a road surface, the vehicle having a vehicle superstructure and a floor portion, the installation comprising: shielding means between the vehicle and the road surface, means for producing a vacuum below the vehicle for sucking off at least within the area bounded by said shielding means, means for transferring said shielding means from a rest position remote from the road surface into a use position near the road surface, said shielding means comprising an annular cushion means enclosing the bounded area, said transfer means comprising retaining means for connecting the annular cushion means to the vehicle superstructure, said retaining means comprising bands disposed between said annular cushion means and said road surface and means for stressing said bands such that said annular cushion means is biased toward the rest position, one end of each of the bands being secured to the floor portion of the vehicle and the other end of each of the bands being secured to said stressing means.

2. An installation according to claim 1, wherein said means for transferring the shielding means from the rest position into the use position includes a means for inflating the annular cushion means.

3. An installation according to claim 2, wherein said annular cushion means is constructed hose-like and has a substantially circularly shaped cross section in the inflated condition.

4. An installation according to claim 3, wherein said annular cushion means consists of elastically deformable material.

5. An installation according to claim 3, further comprising at least one sealing strip means provided on said annular cushion means, and at least one sealing strip support means on the side of the annular cushion means facing the road surface, said sealing strip support means defining the minimum distance between the road surface and the annular cushion means in the use position.

6. An installation according to claim 5, wherein said at least one sealing strip support means is disposed between said annular cushion means and said sealing strip means.

7. An installation according to claim 2, further comprising a control means for controlling the degree of filling of the annular cushion means in dependence on the loadconditioned ground clearance of the vehicle.

8. An installation according to claim 2, further comprising at least one sealing strip means provided on the side of the annular cushion means facing the road surface.

9. An installation according to claim 8, wherein said sealing strip means is lip-shaped.

10. An installation according to claim 8, further comprising at least one sealing strip support means provided on the side of the annular cushion means facing the road surface, said sealing strip support means defining the minimum distance between the road surface and the annular cushion means in the inflated condition.

11. An installation according to claim 10, wherein said at least one sealing strip support means is disposed between said annular cushion means and said sealing strip means.

12. An installation according to claim 11, wherein said sealing strip means are disposed at least partially outside of said at least one sealing strip support means in relation to the area bounded by said shielding means.

13. An installation according to claim 8, wherein said sealing strip means are arranged in a pulled relation to the driving direction of the vehicle such that a portion of the sealing strip means adjoining the annular cushion means lies forwardly of a portion of the sealing strip means abutting the road surface.

14. An installation according to claim 1, further comprising control means for controlling the degree of filling of the annular cushion means in dependence on the load-conditioned ground clearance of the vehicle.

15. An installation according to claim 1, further comprising at least one sealing means provided on the side of the annular cushion means facing the road surface.

16. An installation according to claim 15, wherein said sealing strip means is lip-shaped.

17. An installation according to claim 16, further comprising at least one sealing strip support means provided on the side of the annular cushion means facing the road surface, said sealing strip support means defining the minimum distance between the road surface and the annular cushion means in the use position.

18. An installation according to claim 17, wherein said at least one sealing strip support means is disposed between said annular cushion means and said sealing strip means.

19. An installation according to claim 18, wherein said sealing strip means are disposed at least partially outside of said at least one sealing strip support means in relation to the area bounded by said shielding means.

20. An installation according to claim 19, wherein said sealing strip means are arranged in a pulled relation to the driving direction of the vehicle such that a portion of the sealing strip means adjoining the annular cushion means lies forwardly of a portion of the sealing strip means abutting the road surface.

21. An installation according to claim 15, wherein said means for transferring the shielding means from the rest position into the use position comprises a means for inflating the annular cushion means.

22. An installation according to claim 1, wherein said stressing means resiliently stresses said bands.

23. An installation according to claim 1, wherein said stressing means elastically stresses said bands.

24. An installation for increasing the road traction between a vehicle and a road surface, the vehicle having a vehicle superstructure, the installation comprising: a shielding means disposed below the vehicle between the vehicle and the road surface, means for transferring the shielding means from a rest position remote from the road surface into a use position near the road surface, means for producing a vacuum below the vehicle for sucking off air at least within the area bounded by said shielding means, said shielding means including an elliptical air cushion means enclosing said area, the major axis of said elliptical air cushion means extending substantially transversely to the vehicle longitudinal axis, means for connecting said air cushion means to the vehicle superstructure, means for inflating said air cushion means, control means for controlling the degree of inflation of said air cushion means in dependence on the load-conditioned ground clearance of the vehicle, at least one lip-shaped sealing means provided on a side of said air cushion means facing the road surface, at least one support rib means connected to said side of said air cushion means, said support rib means supporting said sealing strip means and determining a minimum distance between the road surface and said air cushion means, said sealing strip means being arranged in a pulled relation to the driving direction of the vehicle such that a portion of the sealing strip means adjoining said air cushion means lies forwardly of a portion of the sealing strip means abutting the road surface, said sealing strip means extending outwardly approximately tangentially to the small radii of curvature of the ellipse along the major axis of said elliptical air cushion means.

25. An installation according to claim 24, wherein said air cushion means comprises a ring channel means having an open side directed toward the road surface, and a covering means disposed over the open side of the ring channel means for forming an air-tight closure with the ring channel means.

26. An installation according to claim 25, wherein said covering means is inverted out of the ring channel means when said air cushion means is inflated.

27. An installation according to claim 26, wherein said covering means consists of an elastically deformable material.

28. An installation according to claim 24, wherein said means for connecting said air cushion means to said vehicle superstructure comprises at least one retaining means, and means for stressing said retaining means such that said air cushion means is biased toward the rest position.

29. An installation according to claim 28, wherein said stressing means resiliently stresses said retaining means.

30. An installation according to claim 28, wherein said stressing means elastically stresses said retaining means.

31. An installation according to claim 28, including a floor disposed above the annular cushion means, said retaining means comprising bands engaging said air cushion means at least within the area of a zone thereof facing the floor.

32. An installation according to claim 31, wherein said air cushion means is constructed hose-like and has a substantially circularly shaped cross-section in the inflated condition.

33. An installation according to claim 32 wherein said air cushion means consists of an elastically deformable material.

34. An installation according to claim 28, wherein said air cushion means comprises a ring channel means having an open side directed toward the road surface, and a covering means disposed over the open side of the ring channel means for forming an air-tight closure with the ring channel means.

35. An installation according to claim 34, wherein said covering means is inverted out of the ring channel means when said air cushion means is inflated.

36. An installation according to claim 35, wherein said covering means consists of an elastically deformable material.

* * * * *